(12) United States Patent
O'Hare et al.

(10) Patent No.: US 6,484,173 B1
(45) Date of Patent: Nov. 19, 2002

(54) CONTROLLING ACCESS TO A STORAGE DEVICE

(75) Inventors: Jeremy O'Hare, Milford, MA (US); Brian Garrett, Hopkinton, MA (US)

(73) Assignee: EMC Corporation, Hopkinton, MA (US)

( * ) Notice: Subject to any disclaimer, the term of this patent is extended or adjusted under 35 U.S.C. 154(b) by 287 days.

(21) Appl. No.: 09/604,592

(22) Filed: Jun. 27, 2000

Related U.S. Application Data

(63) Continuation-in-part of application No. 09/533,009, filed on Mar. 22, 2000.
(60) Provisional application No. 60/180,632, filed on Feb. 7, 2000.

(51) Int. Cl.[7] .............................................. G06F 17/30
(52) U.S. Cl. ......................................................... 707/9
(58) Field of Search ........................... 707/9, 3, 10, 104; 709/242, 244; 705/42

(56) References Cited

U.S. PATENT DOCUMENTS

| | | | |
|---|---|---|---|
| 4,607,346 A | * | 8/1986 | Hill .............................. 711/114 |
| 5,206,939 A | | 4/1993 | Yanai et al. |
| 5,778,394 A | | 7/1998 | Galtzur et al. |
| 5,845,147 A | | 12/1998 | Vishlitzky et al. |
| 5,857,208 A | | 1/1999 | Ofek |
| 5,948,040 A | * | 9/1999 | DeLorme et al. ............. 340/990 |
| 6,366,913 B1 | * | 4/2002 | Fitler et al. .................... 707/10 |
| 6,374,358 B1 | * | 4/2002 | Townsend .................... 713/166 |

* cited by examiner

*Primary Examiner*—Wayne Amsbury
*Assistant Examiner*—Sana Al-Hashemi
(74) *Attorney, Agent, or Firm*—Choate, Hall & Stewart

(57) ABSTRACT

Controlling access to a data storage device includes defining a plurality of groups that access the data storage device, defining a plurality of pools of devices of the data storage device, and, for at least one of the groups, determining access rights with respect to at least one of the pools. The pools of devices may include communication ports and/or memory segments of the storage element. The access rights may indicate whether system calls are allowed on the communication ports. In some embodiments, restricting access to a data storage device includes coupling each of a plurality of host requestor systems to the storage element by one of a plurality of ports provided for the storage element and selectively determining, for each of the ports, whether system calls are allowed, where, for the ports in which system calls are not allowed, a system call by the host systems coupled thereto causes the storage element to indicate that the system call was not performed. In other embodiments, the access to pools of memory resources having a unique ID number is restricted to requestors having unique ID numbers in a data base that matches allowed requestors and request types to allowed pools of memory.

50 Claims, 5 Drawing Sheets

Fig. 5

| REQUESTOR GROUPS \ DEVICE POOLS | W,X,Y,Z | W | X | W,Z | X,Y |
|---|---|---|---|---|---|
| Q,R,S,T | NONE | B,C,M | B,C | B,M | NONE |
| Q | B,C,M | B,C,M | B,C,M | B,C,M | B,C,M |
| R,S | NONE | B,C,M | B,C | B,M | NONE |
| V | NONE | NONE | B | NONE | NONE |
| S | B,C | B,C,M | B,C | B,M | B,C,M |
| | 102 | 104 | 106 | 108 | 110 |
| | 112 | 114 | 116 | 118 | 120 |

100

CONTROLLING ACCESS TO A STORAGE DEVICE

CROSS REFERENCE TO RELATED APPLICATIONS

This application is a CIP of U.S. patent application Ser. No. 09/533,009 filed on Mar. 22, 2000 (pending), which is based on U.S. provisional patent application No. 60/180,632 filed on Feb. 7, 2000 (pending), which is incorporated herein by reference.

BACKGROUND OF THE INVENTION

1. Field of the Invention

This application relates to the field of computer data storage and more particularly to the field of configuring control system call access to data storage devices.

2. Description of Related Art

Host systems may store and retrieve data using a data storage device containing a plurality of host interface units (ports) that communicate with and store and retrieve data on internal storage facilities provided within the data storage device. Such data storage devices are provided, for example, by EMC Corporation of Hopkinton, Mass. and disclosed in U.S. Pat. No. 5,206,939 to Yanai et al., U.S. Pat. No. 5,778,394 to Galtzur et al., U.S. Pat. No. 5,845,147 to Vishlitzky et al., and U.S. Pat. No. 5,857,208 to Ofek.

The host systems may be assigned limited access to specific portions of the internal storage facilities, where that access may include reading and writing data and "system calls" that cause the data storage device to execute administrative-like operations (e.g., automatic mirroring, copying, back up). The system calls do not directly read and write data. However, even so, system calls may cause one of the user host systems to indirectly access data allocated to another one of the host systems. In addition, remote system calls may be issued to a storage element through a remote storage device (e.g., in a disaster recovery situation) or through a fabric port.

The use of system calls which may provide one host system with unintended indirect access to a memory resource allocated to another host system may not be a problem if all host systems and the entire storage device are controlled by a single entity (i.e., are all owned and operated by a single company) that is capable of coordinating access among different groups within the entity. However, in instances where not all of the host systems are controlled by a single entity (e.g., in instances where a plurality of different smaller companies share use of a single data storage device) and in instances where different groups of the same entity access the host systems in an uncoordinated manner, it may be undesirable to allow such indirect access of internal storage facilities using system calls, especially in instances where the data storage device contains sensitive data of one or more of the entities and/or groups within a single entity. Furthermore, in configurations where a storage device is coupled to additional storage devices to provide backup services therefor, it may be undesirable to allow unintended access to data via system calls.

SUMMARY OF THE INVENTION

According to the present invention, controlling a data storage device includes providing at least one requestor group that accesses the storage device, providing at least one pool of devices of the data storage device, providing a plurality of access types, and determining if a request by a requestor of the at least one requestor group is permitted for a device of the at least one pool of devices, where the device is an object of the request. The access types may include at least one of mirroring, copying, back up, splitting, and tracking system calls. The access types may further include reading data and writing data. The at least one group and the at least one pool may include at least one of logical units having unique ID numbers and physical units. The at least one pool may include at least one of: communication ports of the data storage device and portions of memory of the data storage device. The pool may include communication ports and the access rights that indicate whether system calls are allowed on the communication ports. The pool may include portions of the memory and the access rights indicate at least one of: read and write access to the sections.

According further to the present invention, controlling access to a data storage device includes providing a requestor identification number for each requestor having access to the data storage device, where the identification number uniquely identifies each requestor, partitioning memory of the data storage device into a plurality of memory segments and defining an identification number for each of the segments, providing a plurality of request types including at least one of: read, write, mirroring, copying, back up, splitting, and tracking system calls, and allowing a requestor a selected type of request access to a selected one of the plurality of memory segments only if a database of requestor identification numbers indicates that the selected type of request to the selected memory segment is allowable according to the requestor identification number. Controlling access may also include issuing an access request denied indication if the database indicates that the identification number is not allowed the specified type of access to the specified memory segment. An override memory location may store one of: a pass override condition, a reject override condition and no override condition. The override memory location may be checked before examining the database, and, if a pass override condition is stored therein, the request may be allowed. A value stored in the override memory location may revert to the no override condition after a specified time period. The specified time period may be thirty minutes. The override memory location may be checked before examining the database, and, if a reject override condition is stored therein, the request may be denied. The plurality of memory segments may be grouped into pools of devices and allowing a requestor a selected type of request access may include examining a particular one of the pools of devices corresponding to the selected memory segment.

According further to the present invention, controlling access to a data storage device includes providing at least one group of requestor devices from a plurality of requestor devices that access the data storage device by issuing requests for at least one of: reading data in a specified portion of the data storage device, writing data into a specified portion of the data storage device, backing up data from a specified portion of the data storage device, mirroring data, copying data from a specified portion of the data storage device, splitting volumes of the data storage device, and tracking changes to volumes of the data storage device, providing a plurality of pools of memory resources from a plurality of individual addressable memory resources of the data storage device, and, prior to accessing the memory, providing control logic for the data storage device to determine whether a request from one of the plurality of requestor devices for access to at least one of the plurality of pools of memory resources is permissible. An override memory location may store one of: a pass override condition, a reject override condition and no override condition. The override memory location may be checked before examining the database, and, if a pass override condition is stored therein, the request may be allowed. A value stored in the override memory location may revert to the no override condition after a specified time period. The specified time period may be thirty minutes. The override memory location may be checked before examining the database, and, if a reject override condition is stored therein, the request may be denied. An access level for a group corresponding to the requestor may be set to provide a lower access level than an access level set for any member of the group of requestors. The access level of the group may be examined before the access level of the requestor and, if access for the group is allowed, no check may be made on the access level of the requestor. A pool of memory resources may allow more access than an access level set for any member of the pool. The access level of the pool may be examined before the access level of the memory segment, and if access for the pool is not allowed, no check may be made on the access level of the memory segment.

According further to the present invention, controlling access to a data storage device includes associating an ID number that identifies at least one of: a requestor having access to the storage element and a group to which the requestor belongs, and determining if the requestor is allowed a requested type of access operation to at least a portion of the data storage device in accordance with access information, where the access information includes one or more access operations associated with at least one of: the requestor ID number, an ID number of the group, a password associated with the requestor, and a password associated with the group. The access operation may include at least one of: backup, mirror, copy, split, and track. The access operation may further include at least one of: read data and write data. The access information may use only one of: the requestor ID number, the ID number of the group, the password associated with the requestor, and the password associated with the group. The access information may use a combination of the requestor ID number and the ID number of the group. The access information may use a combination of the ID number of the group and at least one of: the password associated with the requestor and the password associated with the group. The access information may use a combination of the ID number of the group and the password associated with the group.

According further to the present invention, controlling access to a data storage device includes associating a password that identifies at least one of: a requestor having access to the storage element and a group to which the requestor belongs, and determining if the requestor is allowed a requested type of access operation to at least a portion of the data storage device in accordance with access information, where the access information includes one or more access operations associated with the password. The access operation may include at least one of: backup, mirror, copy, split, and track. The access operation may further include at least one of: read data and write data. The password may be associated with the requestor or with the group.

With such an arrangement computer system access to data storage device resources, especially shared resources, whether centralized or distributed, may be controlled to prevent unauthorized control, access or storage resource reconfiguration changes from occurring to selected pools of memory storage. Such detailed control of access permission allows the sharing of memory storage resources among separate and distinct user groups in an efficient fashion, without each user group losing control over who may have access to sensitive data, and without losing control over the memory configuration. In some systems, only a restricted set of system administrators may have access permission to configure portions of the data storage devices available into resource pools having controlled access from groups of host computer systems or other users. The system administrators may group individual memory resource element into various memory device pools, each pool having a different level of system call access to each individual one of the requesting host systems, or to groups of host systems. Thus the described arrangement provides a simple but flexible method of controlling access to a large group of memory resources by a large group of host systems and users, while satisfying the requirements of different host environments and desired memory configurations.

The host systems requesting memory system access (i.e., requestors) may be individual large scale computer systems, each individual one with multiple real time or batch users, a work group of personal computers connected to a main memory via a local area network, or other data storage devices performing routine back up storage functions, or any of the many other well known types of electronic device that may be connected to a data storage device. The data storage devices may be set up using a large array of individual magnetic memory disks, addressable sections of a large mass storage disk, semiconductor memory, memory system communication access ports, or any of the many well known forms of data storage.

The disclosed embodiments allow restricted access to selected portions of the memory based upon a matrix containing an ID for every host system that may request access to the memory, an ID for every available memory element, and which types of access each host ID is allowed with each memory element. The requestor ID number may be created using an existing host computer system hardware ID, a user password or a group password in a multi-user computer system, a Fibre Channel world wide name, a URL in an internet access configuration, a unique random access number assigned by the memory system, a default value, or any number that may serve to identify the requesting device for the purposes of checking for allowable access rights to the memory segment addressed by the request. Such a check might be performed by comparing the ID against a data base of allowable requestors for the addressed memory, typically in the form of a matrix. For example, a large host computer system with a hardware ID of 111AAA2, may have 10 terminals and 50 authorized user accounts. If all 50 users are permitted by the host system administrator to access every portion of the centralized memory, then appropriate access may be obtained by simply allowing access according to the ID number of the particular memory access port that connects the storage system to the host computer system. However, if the 50 users belong to 5 different work groups, each of which do not wish to have their data storage areas affected by the actions of the other four work groups, then access may be allowed by a combination of hardware ID, which may give access to a shared memory section common to all 50 users, plus an individual user password, which may provide increased access to predetermined portions of the memory area allocated to the large host computer. Another example might be a large memory system accessible via the internet. The specific memory resources addressable by each of the millions of internet connected computers may vary from no access of any type, to complete system call access to the addressed memory section, depending upon the contents of a memory containing the ID number of memory sections permitting access by the URL, or alternately an assigned access ID number, of the requestor.

The described method may allow any level of requestor access to the addressed memory element or section ranging from no access, to read only, to system calls such as copy or mirror, or any level of system administrator access that may be defined and contained in the access control logic. Multiple requestors may have different levels of access to the same memory element, and requestors may be grouped into multiple convenient requestor groups having a unique group ID number and defined access to specified memory elements. In embodiments where both the group and requestors are assigned ID's, the group ID may correspond to an access level to a device pool that is less than or equal to the lowest access level that any individual member of the group has with respect to the device pool. Such an arrangement permits access to be granted more quickly to an authorized request since it is likely that the access control logic memory that must be searched to find the group ID and determine allowable access limits will be smaller than would be the case for each individual requestor.

Similarly, multiple memory elements may be grouped into pools of memory devices, and given a pool ID number. Memory elements may be individual magnetic disks, portions of disks, groups of connected disks, semiconductor memory such as cache, or communications ports connecting the data storage device to the requestor or host computer systems. In some systems, the pool would allow more access than any one member of the pool with regard to a requestor ID, thus if a requestor is found to not have enough access to address the pool no further searching need be done, and efficiency and access speed is improved.

BRIEF DESCRIPTION OF THE DRAWINGS

FIG. 5 is a table showing the association between the requestor and the storage element and the allowable system calls.

DETAILED DESCRIPTION OF THE PREFERRED EMBODIMENTS

Figure 1:
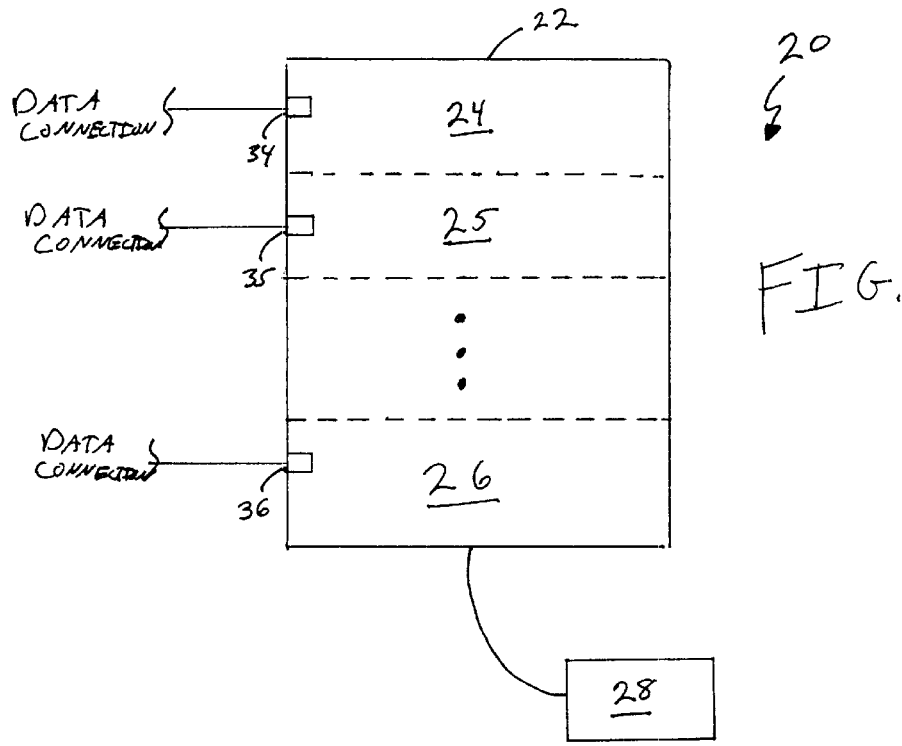
FIG. 1 is a schematic diagram that illustrates a storage device configured according to the present invention.

Referring to FIG. 1, a system 20 includes a data storage device 22 capable of storing data for a plurality of host systems coupled thereto (not shown), via the data connections. The host systems may include one or more host processors or other data storage devices. The data storage device 22 may be implemented using a Symmetrix storage device manufactured by EMC Corporation of Hopkinton, Mass. or by other types of data storage devices capable of providing the functionality described herein.

The data storage device 22 is shown as being partitioned into a plurality of sections 24–15 26, each of which represents a portion of the resources of the data storage device 22 that are accessed by one of the host systems coupled thereto (e.g., a host processor or another data storage device). These resources may include, for example, portions of the internal memory of the data storage device 22.

An external control device 28 may be coupled in a conventional manner to the data storage device 22 to control operations thereof. The external control device 28 may be implemented using the Symmetrix SymmWin functionality, which is provided by EMC Corporation of Hopkinton, Mass. as software for operation on a conventional computer workstation and other appropriate software and hardware to facilitate connection and communication between the workstation and the data storage device 22. In some embodiments, the external control device 28 acts like a dumb terminal that communicates with the data storage device 22 using conventional software provided therewith for that purpose. Operations performed by the external control device 28 are discussed in more detail hereinafter.

The data storage device 22 also includes a plurality of external ports 34–36 which provide communication for the host systems coupled to the storage device 22. The ports 34–36 allow the host systems to store data to and retrieve data from the data storage device 22. Each of the ports 34–36 handles communication for one of the host systems coupled to the data storage device 22.

The host systems coupled to the data storage device 22 may control the data storage device 22 and may control access and use of the sections 24–26 of the data storage device 22 by using administrative-like system calls that may be provided through the ports 34–36. Such system calls may, in effect, control configuration and operation of the data storage device 22. In some embodiments, system calls are differentiated from calls that simply read and write data from and to the ports 34–36 even though, as discussed above, some system calls may indirectly cause data stored in the data storage device 22 to be affected.

In instances where the data storage device 22 and all of the host systems coupled thereto are controlled by a single entity, then having the host systems perform system calls that may affect access by other ones of the host systems is straight-forward. However, in instances where the host systems may be controlled by different entities, or different groups within the same entity, then it may become problematic to allow one host system to make a system call that could affect one of the sections 24–26 of the data storage device 22 allotted to another host system controlled by a different entity. In other words, system calls made by host systems controlled by different entities could conflict.

In order to address such situations, some or all of the ports 34–36 of the data storage device 22 may be configured not to accept system calls from the host systems (or any other device for that matter) coupled thereto. Since the system calls may modify the configuration and access scheme of the data storage device 22, then restricting system calls at some or all of the ports 34–36 inhibits the host systems coupled thereto from accessing the resources allocated to other host systems. Thus, for example, if the section 24 represents the storage memory allocated to the host system coupled to the port 34 and the section 25 represents storage memory allocated to the host system coupled to the port 35, then inhibiting system calls at the ports 34, 35 prevents, for example, the host system coupled to the port 34 from improperly accessing the section 25 of the storage memory allocated to the host system coupled to the port 35. As discussed in more detail below, the configuration and allocation functions performed by system calls may be performed only by the external control device 28 or by the external control device and only a subset of the host systems coupled to the ports 34–36.

Figure 2:
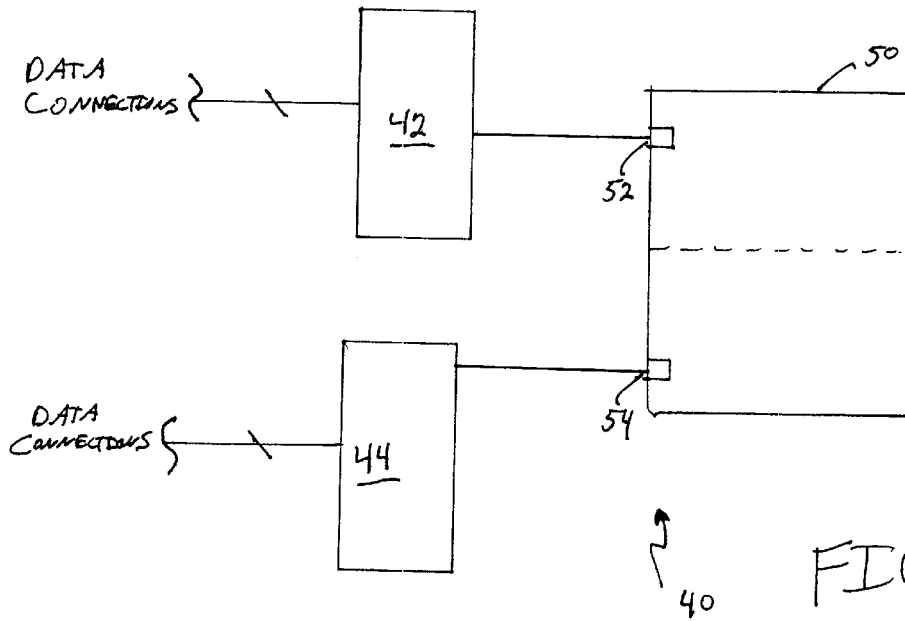
FIG. 2 is a schematic diagram that illustrates a plurality of storage devices configured according to the present invention.

Referring to FIG. 2, a system 40 illustrates a configuration where other data storage devices are coupled to another storage device. The system 40 includes a first data storage device 42, a second data storage device 44, and a third data storage device 50. The first data storage device 42 is coupled to third data storage device 50 via a port 52. The second data storage device 44 is coupled to the third data storage device 50 via a port 54.

The system 40 shown in FIG. 2 could represent, for example, a third party data backup scheme where a first entity controls the first data storage device 42, a second, unrelated, entity controls the second data storage device 44 and where both the first and second entities obtain data backup services from a third entity that controls the data storage device 50. In some instances, the data storage device 50 is provided in a location that is remote from the locations of the first and second data storage devices 42, 44. In such a configuration, it may be useful to inhibit system calls at the ports 52, 54 to prevent the data storage device 42 coupled to the port 52 from accessing portions of the data storage device 50 that are allocated for use by the data storage device 44 coupled to the port 54. Similarly, it may desirable to inhibit system calls at the port 54 to prevent the data storage device 44 from accessing portions of the data storage device 50 allocated for use by the data storage device 42. A mechanism for inhibiting such access is discussed in more detail hereinafter.

Figure 3:
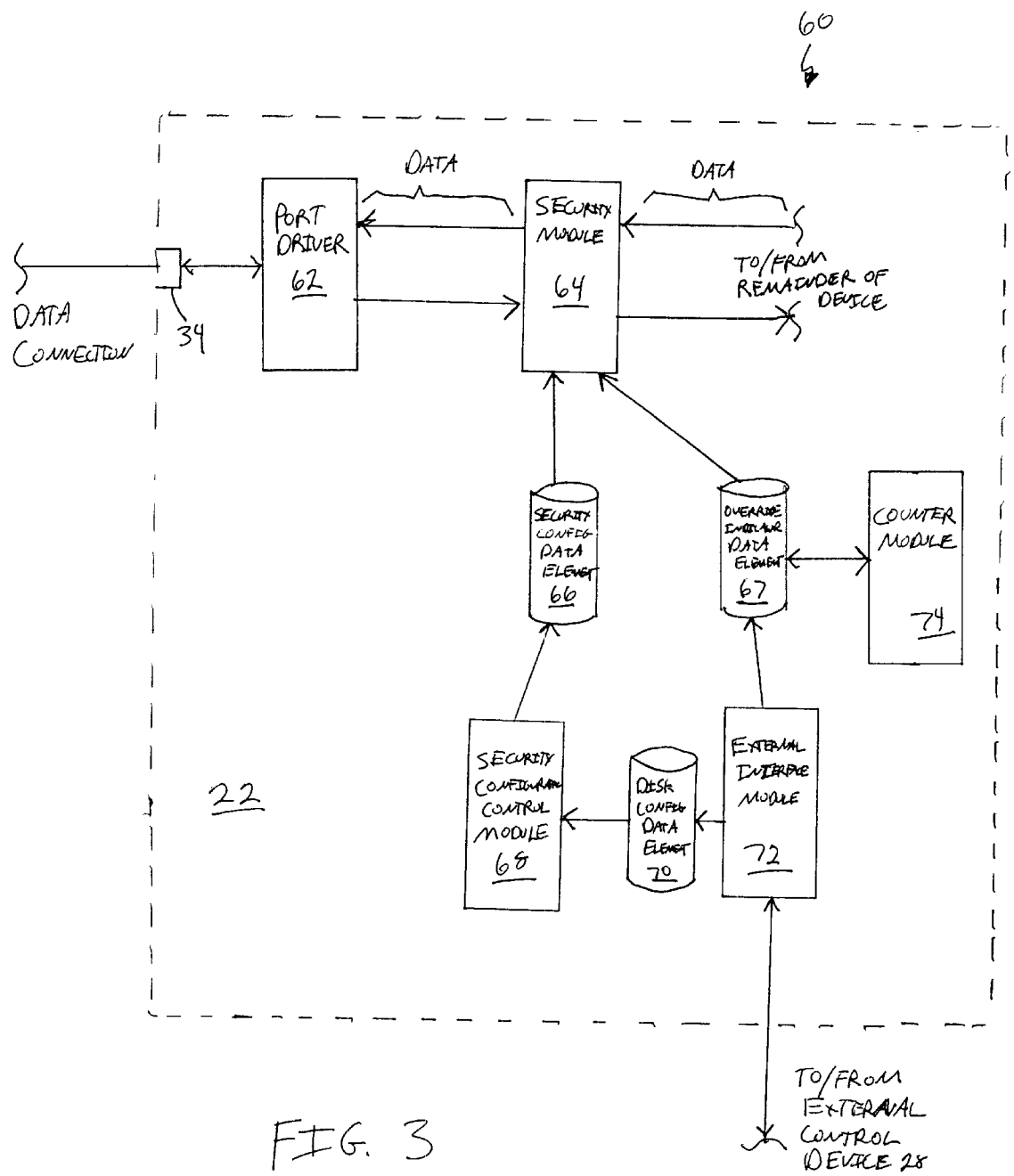
FIG. 3 is a data flow diagram that illustrates operation of an embodiment of the present invention.

Referring to FIG. 3, a data flow diagram 60 illustrates operation of software that handles communication and system call enabling and disabling at the ports 34–36 of the data storage device 22. A port driver 62 receives data provided to the data storage device 22 via the port 34 and provides data from the data storage device 22 through the port 34 to a host system coupled thereto (not shown). The port 34 provides communication between the host system and the data storage device 22. The diagram 60 only shows a single port 34 and a corresponding single port driver 62 in order to facilitate the discussion that follows. However, it may be appreciated by one of ordinary skill in the art that the functionality described herein is extendable to any or all of the ports 34–36 of the data storage device 22.

The port driver 62 is coupled to a security module 64 so that all data going in to and out of the data storage device 22 via the port 34 is controlled by the security module 64. Thus, as shown in FIG. 3, the security module 64 includes connections to and from the remainder of the data storage device 22 to provide normal functionality thereof. However, as discussed in more detail below, the security module 64 may inhibit the transfer of data and/or system calls from/to the data storage device 22 under certain circumstances. Operation of the security module 64 is discussed in more detail hereinafter.

The security module 64 is provided with security configuration information from a security configuration data element 66. As discussed in more detail below, the security configuration data element 66 controls operation of the security module 64 and thus controls the data that may be provided to and from the port driver 62. The security module 64 is also provided with information from an override indicator data element 67 that also controls operation of the security module 64. A security configuration control module 68 controls the contents of the security configuration data element 66 to indicate the type of access permitted at the port 34 through the port driver 62. The security configuration control module 68 can provide data indicating whether system calls are accepted by the port driver 62 and subsequently handled by the remainder of the data storage device 22.

In some embodiments, the override indicator data element 67 contains one variable for each of the ports 34–36, where each of the variables take on one of three values indicating one of: no override, open override, and close override. The open override value indicates that, irrespective of the settings in the security configuration data element 66, the corresponding one of the ports 34–36 will accept system calls. Similarly, the close override value indicates that, irrespective of the settings in the security configuration data element 66, the corresponding one of the ports 34–36 will not accept system calls.

The security configuration control module 68 obtains data from a disk configuration data element 70 that is stored in an internal non-volatile area of the data storage device 22 (e.g., provided on a portion of disk space used for general control of the data storage device 22). The disk configuration data element 70 includes information regarding the type of access that is permitted to each of the ports 34–36 of the data storage device 22.

An external interface module 72 includes conventional software for communicating with the external control device 28. The external interface module 72 provides a mechanism for modifying the disk configuration data element 70 to indicate the type of access provided at each of the ports 34–36 of the data storage device 22. Note also that, as discussed in more detail below, the external interface module 72 may provide a mechanism for overriding the data of the security configuration data element 66 by writing to the override indicator data element 67. The override may be permanent or may be set to a predetermined amount of time, such as thirty minutes. In the case of the override being set to a predetermined amount of time, a counter module 74 interacts with the override indicator data element 67 to reset the override after the amount of time. The mechanism for this is discussed in more detail below.

Figure 4:
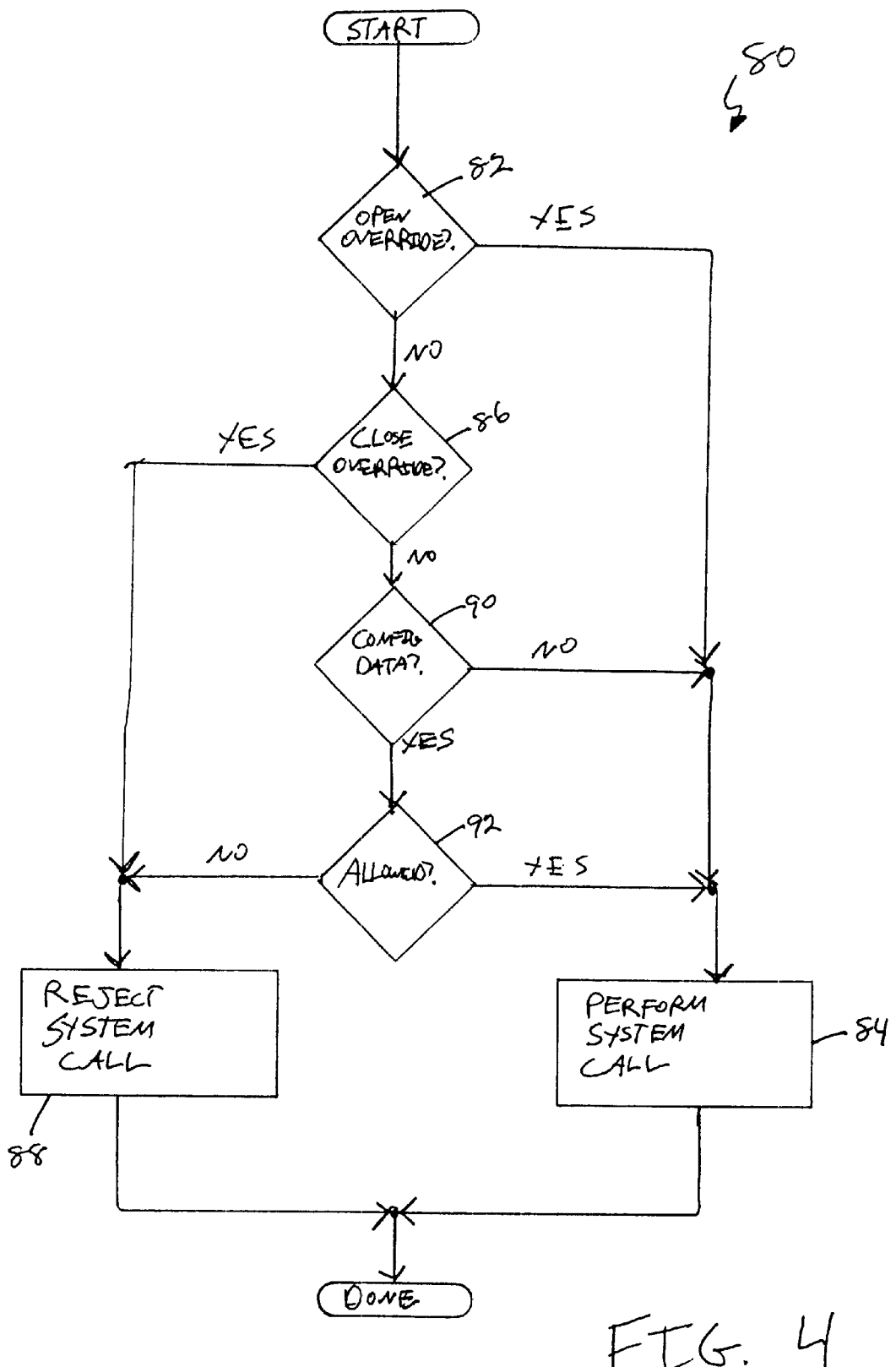
FIG. 4 is a flow chart that illustrates steps performed according to an embodiment of the present invention.

Referring to FIG. 4, a flow chart 80 illustrates operation of the system described herein. At a first test step 82, it is determined whether the open override has been set. An open override occurs when a user at the external control device 28, having appropriate access security, indicates that an override of the default settings for the security of one or more of the ports 34–36 is desired. If so, the user uses the external interface module 72 to access the override indicator data element 67 accordingly. In one embodiment, the open override may be set by a user with system control security and may only exist for a predetermined amount of time after being set. The time limit may be implemented by the counter module 74 of FIG. 3 in a conventional manner which counts for the predetermined amount of time (e.g., thirty minutes) after the open override is set and provides an appropriate reset to indicate no override after the predetermined amount of time.

If it is determined that the test step 82 that the open override has been set, then control passes from the test step 82 to the step 84 where the system call that is requested at the port is performed (i.e., is passed through to the remainder of the data storage device 22). Irrespective of any other configuration setting for the port 34, if the open override has been set, then any system calls presented at the port 34 are executed for so long as the open override remains in effect.

If it is determined at the test step 82 that the open override is not set, then control passes from the test step 82 to a test step 86 where it is determined if a close override has been set. Just as with the open override, the close override being set indicates that, irrespective of any other settings for the port 34, no system calls will be allowed at the port for so long as the close override remains in effect. Also, just as with the open override, the close override may be set for a predetermined amount of time, such as thirty minutes, and then reset thereafter, using the counter module 74.

If it is determined that the test step 86 that the close override has been set, then control passes from the test step 86 to a step 88 where the system call requested by a host system coupled to the port 34 is rejected. Rejecting the system call at the step 88 includes not performing the operation(s) dictated by the system call and returning a code to the requesting host system indicating that the system call has been rejected.

Following the test step 86 is a test step 90 which determines if configuration information exists for the port. In some embodiments, it may be possible to eliminate altogether the security configuration data element 66 (or alternatively, not create the security configuration data element 66 in the first place), in which case it is assumed that there is no security that thus all system calls may be requested at any of the ports 34–36. Thus, if it is determined at the test step 90 that there is no configuration information (i.e., no security configuration data element 66), then control passes from the test step 90 to the step 84 where the system call is performed.

If it is determined at the test step 90 that there is configuration data (i.e., the security configuration data element 66 exists), then control passes from the test step 90 to a test step 92 where the configuration information is examined to determine if a system call may be requested through the port 34. This may be indicated in the security configuration data element 66 in any one of a variety of conventional manners, including having a Boolean variable (flag) for each port indicating whether system calls are permitted at each of the ports. If it is determined at the test step 92 that system calls are not allowed, then control passes from the step 92 to the step 88 where the requested system call is rejected, as discussed above. Alternatively, if it is determined at the test step 92 that system calls are allowed, then control passes from the test step 92 to the step 84 where the system call is performed.

Note that the technique described herein may be generalized so that operations are performed and resources are allocated/assigned based on the identity of the requestor of the information (i.e., the identifier of the host system). Thus, the technique may be generalized as providing a mechanism where the identifier of a requestor (or group of requestors) is provided with particular access type or permissions to perform specific operations to or with certain devices or certain pools of devices (e.g., collections of devices). Thus, rather than simply restricting system calls on a port by port basis, it may be sufficient to indicate that a particular host system (or group of host systems) is or is not allowed to make system calls at any of the ports (or pool of ports). In addition, such a generalized scheme may be used to selectively allocate access to memory locations (e.g., the pool of devices) based on the identifier of a host system or group of host systems.

In a generalized system, a system call may consist of a requestor ID, an access type, and a corresponding device. Optionally, a password may be used and/or the password may be associated with the requestor ID and/or with a group to which the requestor belongs. The requestor may be a host computer, another data storage device, or any system capable of making a system call to the data storage device. The access type may indicate the type of access requested, such as disk mirroring, backup, copy, BCV operations, ChangeTracker operations, etc. BCV and ChangeTracker operations are provided by EMC Corporation of Hopkinton, Ma. involve handling mirrored volumes. BCV relates to volumes that are start out as mirrored volumes and are then split to operate independently. ChangeTracker involves tracking differences between split volumes by tracking operations to each so that if one volume needs to be restored from another, only the changed tracks need to be written.

In some embodiments, the access control includes controlling read and write operations, while in other embodiments, only system administrative calls are controlled. The corresponding device may indicate the device affected by the request, so that, for example, if the request includes a disk read operation, the device would be the disk (or portion of a larger disk space) affected by the read operation.

Referring to FIG. 5, a matrix 100 illustrates providing information associating requestor systems Q, R, S, T and V (and groupings of the requestor systems) to access levels B, C, and M for devices W, X, Y and Z (and pools of the devices). In some embodiments, the pools of devices may have a unique ID as opposed to the combination ID illustrated in FIG. 5.

The matrix 100 has columns 102, 104, 106, 108 and 110 of various possible combinations of the devices W, X, Y and Z, and pools of the devices. A system may have more or less devices than the four shown in the matrix 100, and the matrix 100 may alternatively be in the form of a chart, a list, a database or any other technique for associating levels of permission with combinations of requesting users and permitting resources. The matrix 100 has rows 112, 114, 116, 118 and 120 corresponding to requestor systems Q, R, S, T and V, such as host computers or other electronic devices, that may make access requests of devices that are part of the data storage device 22. The number of requestors may be of any number.

The groupings of requestors may be made by a system administrator to provide improved speed of access by reducing the amount of searching that must be performed to find the proper combination of requestor and accessed devices. For example, all the members of a work group might have individual access ID numbers assigned that include as a part of the individual access ID number, a workgroup ID number. Thus when the individual is accessing the memory element that is accessible to all members of the work group, then the group ID number may permit more rapid searching of the database. Note also that, in instances where passwords are used to identify requestors, the passwords may be assigned to the requestors and/or assigned to groups in a manner similar to the way that ID numbers are assigned and the access may be controlled using the passwords either by themselves or in combination with the ID numbers.

Note that some systems may be handled in accordance with the described embodiment by means of assigning a default access ID (and/or default password) to an access request that does not contain a valid access ID (and/or password). In the matrix 100, the default ID is represented by the requestor V in row 118. Note that requestor V has no permitted access to any of the devices except for B type access to device X in column 106. Device X might, for example, represent a public library database that is intended for use by anyone with an Internet connection. Many other potential uses for such an open access may be imagined.

On the other hand, requestor Q in row 114 appears to have complete access to all members of the device pool of the exemplary matrix. Requestor Q might represent the ID of a system administrator, and thus need to be allowed unlimited access to all memory elements for the purposes of control and configuration. Between the two described cases may exist an unlimited number of possible combinations. Note that many more potential access levels than the three shown exemplary levels are possible in accordance with the embodiment described. Also note that providing an individual requestor with particular access levels to the devices (pools of devices) may be accomplished by forming a group containing only the individual requestor.

The group of four requestors (Q, R, S and T) in row 112 are shown as having less allowed access permitted at each of the device pools 102–110 than some of the individual requestors would have as members of different groups. In this example, row 118 which contains the default value V, is not of interest since requestor V is not a part of the requestor group of row 112. In row 120, requestor S has B and C access allowed with device pool column 102, which in the example contains all of the four devices represented by W, X, Y, and Z. Thus the requestor grouping R and S, row 116, would not typically be allowed more than B and C access, and in the example has no access allowed. This might be the case if requestor R was allowed access only to databases contained in, for example, devices corresponding to memory elements W and Z. Further, the four requestor grouping of row 112 may not be allowed greater access than that allowed to a subset grouping, and the group of the row 112 is thus shown as also having no access to device pool of the column 102.

Examples of situations that might allow a requestor such as Q from FIG. 5 to have a great deal of access to all of the memory devices and pools of devices might include a memory system administrator who could allow a password to be reset if lost or forgotten, to override any access control settings for maintenance or service, to allow new memory devices such as new disks to be added or old models removed from the device pools, to reconfigure the membership of the device pools to accommodate changing memory requirements, to create new memory device pools to allow for expanded customer bases, or to provide any other functionality that is provided by a system administrator. An administrator might also reconfigure the membership and number of requestor groups to improve the speed of access control to the device pools, or to define new levels of permitted access, or newly allowed types of system calls to be added as appropriate for the overall data storage device.

When the device and the device pools correspond to portions of memory, the above noted situations relate to the ability to provide authorized users with efficient and flexible memory access to a partitionable data storage device, while retaining the security of confidential user data in the data storage device. The authorization system described provides a mechanism whereby potentially dangerous memory accesses and functions may be rejected or accepted in a uniform fashion, and the access decision may be made before valuable system time is wasted on beginning a memory access execution that may turn out not to be authorized. Authorization codes (and/or passwords) may be used on either an individual host computer or other requestor basis, on a group access basis, or on a combination basis such as shown in the matrix of FIG. 5. If the method is restricted to an ID per potential requestor, then the authorization matrix may be large, and locating the requestor ID might take more time than if requestors were grouped. On the other hand, limiting the access ID numbers to large groups of requestors acts to limit the flexibility of assigning optimum accessibility to various members of the requestor group. Thus the described embodiment may be beneficially provided with access ID numbers for each individual requestor to provide maximum flexibility, and with group ID numbers that may serve to increase the access authorization speed by matching group access values against device pool access values. In other embodiments, access ID numbers are only assigned to groups and are not assigned to individual requestors. A two access matrix method may be used to provide both maximum flexibility and improved authorization speeds in which the first matrix (or other previously described authorization method) examines the requestor group ID versus the device pool ID. If the entire group to which the individual requestor belongs has authorized access for every member of the particular device pool addressed for the type of access requested, then there is no need to look any further. This may be the case if the requestor group ID is allowed only as much access as the lowest member of the group, and if the device pool is only allowed as much access as the most restrictive member of the pool. An example of an access matrix following the above described situation is shown in FIG. 5, as previously discussed. Thus the described access control method may support varying levels of device pool access, with each level of access corresponding to a certain level or combination of access operations. Further, the described method may be compatible with existing methods of blocking dangerous device access operations, such as system calls, by the use of default access ID numbers and allowing physical memory structures such as communication ports to have device pool ID numbers.

The embodiment described above with reference to FIG. 5, includes the feature of having a requestor in more than a single requestor group. A unique requestor ID number may be assigned to an individual host computer system for each requestor group of which the host is a part. Alternatively, the unique ID may be composed of a combination of the group ID and the individual ID number. A combination ID number may take advantage of the two stage matrix access authorization method previously described. Also, in any event, passwords may be used instead of, or as a supplement to, the ID's.

An exemplary configuration for access control of a data storage device may include commands to enable and disable the ID number system (and/or password system), define default and initial access levels for host systems and other requestors, a system administrator password, granting specified ID numbers partial administrator-like access, a temporary override command denying any access to a specified requestor ID for a predetermined amount of time, and a temporary override command giving complete access to a specified ID for a predetermined amount of time. Use of these commands may be restricted to a system administrator who enters the system using a password.

Figure 6:
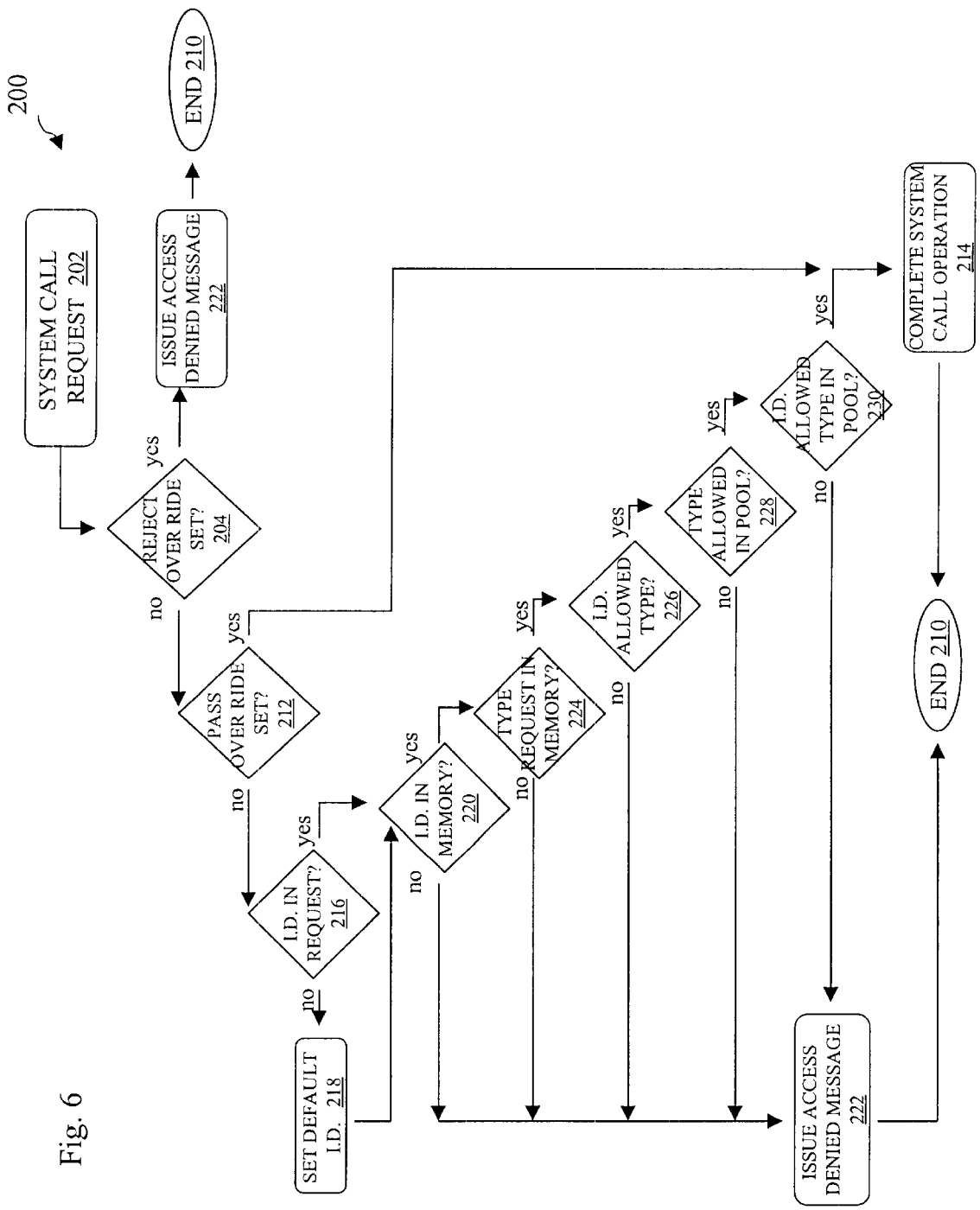
FIG. 6 is a logic flow chart that illustrates the operation of a user logical device embodiment of the present invention.

Referring to FIG. 6, a flow chart 200 shows processing beginning at a step 202, where a requestor system, which may be a host computer, or any other type of electronic equipment such as another memory system, which has access to the data storage device, makes a request for access to a particular device or pool of devices, such as a request to read and write memory, or makes a system call, such as a request copy, mirror data, a BCV operation, a Change-Tracker operation, or back up data. System calls may come directly from the host computer system, or may be relayed by another data storage device, as may be the case in a mirroring request. In some embodiments, only system calls are supported and direct read and write operations are not processed on the number discussed herein.

Following the step 202 is a step 204, where the ID of the host system (the ID of the group to which the host system belongs) making the system call request is checked against a reject override setting to determine if a reject override has been set. The override setting may be stored as a variable in a memory override location. A reject override being set indicates that a system call will be denied irrespective of the access settings for the ID and the corresponding device. Such a reject override condition may be set by a system administrator for many possible reasons, such as system failure, and there may be a timer set to return such an override condition to a no override status following a fixed time period after the override is set. If it is determined at step 204 that there is a reject override set, then the request is not allowed by the data storage device, the data storage device may send an access denied message to the requestor system at a step 222, and the request process ends at a step 210.

If it is determined at the step 204 that no reject system call override has been set, a pass override setting (also possibly stored in the memory override location or possibly in a different location) is checked at a step 212. A pass override indicates that a system call will be allowed irrespective of the access settings of the requestor and the corresponding device. If a pass override has been set, then the storage system completes the system call at a step 214, and processing ends at the step 210. Optionally, a message indicating that the system call access was allowed and completed may be sent to the requesting system.

If there is no pass override set, then the call request is examined to determine if an access ID number is included in the request at step 216. Not all user systems connected to the data storage device may have access ID numbers. The access ID may be the same as the requestor ID, or it may be a different unique number or it may be the ID of the group to which the requestor belongs. In some instances, older systems may still be in use that do not have the capability of newer systems (i.e., an ID or group ID), and thus provides backward compatibility to expand the utility of the system and eases new product introduction. Note also that a password may be used instead of, or as a supplement to, the access ID. If a proper access ID is found in the request, control passes to step 220. If no access ID is found, then a default ID is assigned at step 218 and control passes to step 220 where the access ID is checked to determine if the access ID is valid. If the access ID number is not found in a table of allowable access ID numbers, then control passes to step 222 where a system call access denied message may be sent to the requesting system, and the process ends at the step 210.

If the access ID is matched by the data storage device, then the type of access request is checked at step 224 to determine if the requested specific type of system call is allowed. If the type of request being made is not allowed for the corresponding device (device pool), then control passes to step 222, where a system call access denied message may be sent to the requesting system, and then processing ends end at step 210.

If the request type is generally allowed, the access ID is checked at step 226 to see if the particular requestor (the group to which the requestor belongs) is allowed the particular type of system call requested with respect to the corresponding device (device pool). If not, then control passes to step 222, where a system call access denied message may be sent to the requesting system, and then processing ends at step 210. If the ID is allowed the general use of the type of call that is made, then control passes to step 228 where the device that is affected by the system call is checked to determine if the corresponding pool of devices allows the type of access requested. If the type of access requested is not allowed, then control passes to step 222, where a system call access denied message may be sent to the requesting system, and then processing ends at step 210.

If the device pool does allow the type of access requested, then it is determined at step 230 if the requested access is allowed. This helps maintain a situation where requests are confined to the requestors assigned specific access to device pools such as portion or portions of the memory space of the data storage device. If the ID does not have appropriate access to the device pool, then control passes to step 222 where a system call access denied message may be sent to the requesting system, and the access process ends at step 210. If there is a match between the access ID number, the device pool ID number, and the type of access requested then the system call is completed at step 214, and then the access process ends at the step 210.

The code for the flowchart of FIG. 6 may be implemented using a scheme similar to that shown in FIG. 3 and described above. That is, a security module (similar to the security module 64 of FIG. 3) will perform the steps set forth in FIG. 6. The security data, indicating which groups of users have what types of access to which pools, may be centralized in a conventional manner to provide the functionality described herein. The override settings may be stored in an override memory location. Other techniques for implementing the flowchart of FIG. 6 may be obvious to one of ordinary skill in the art.

The system described herein determines the ID of the user (and/or of the group to which the user belongs) making the system call request, what device pool is involved in the request, what type of request is being made, and whether the system has been configured to allow the request. The device pools may be portions of the memory system divided into separate physical disks, groups of disks, or portions of large disks. The memory resources may be grouped into memory pools that have the same requirement for types of system calls allowed, and for what specific requestors (or groups of requestors) are allowed to have access to the memory. For example, a pool X may have twenty disk systems and have access allowed only to requestors from company A. Pool Y may comprise a portion of a large magnetic disk and allow access by companies A and B, but no mirroring requests by anyone, other than the system administrator, will be allowed. Because the embodiments described allow access based on an ID number, it is possible to give a single large computer with multiple human users a number of different access ID numbers and thereby provide that each different user (and/or groups of users) have different levels of access to different portions of the storage device. This may be useful in cases where different departments in a single company wish to prevent other departments from changing values in a database, or wish to prevent the departments from using more memory space than allowed. The embodiments described herein use the requestor ID number (group ID number) to determine storage access and type of access, and thus constitute a logical device regulator, rather than using a physical regulation means such as controlling access depending upon which memory port the requestor is connected to. As described herein, passwords may be used in place of, or as a supplement to, ID's.

An example of steps for creating access ID numbers and registering them with the data storage device includes a host computer system (or other requestor system type) administrator invoking a utility program to obtain the unique hardware ID of the host computer system, an ID of the group to which the host system belongs, a password for the host system, a password for a group to which the host system belongs, and/or a Fibre Channel worldwide name, and also determining if there exists a need for multiple access ID numbers for the host system. The host administrator supplies the hardware ID (or password or Fibre Channel worldwide name) and the name and operating system used by the host to the system administrator. If multiple individual users are associated with the host system and each need different levels of access, then individual passwords or ID numbers may be assigned to each user. These may be combined with the host system ID number to produce unique ID numbers for each user which may still provide host system information. The users may be grouped and the ID numbers may be provided to each of the groups.

For additional security, the ID numbers may be further randomized by the memory administrator running the ID numbers through what is known as a secure hash program to generate unique ID numbers, called access ID numbers in this case. Note that in instances where different hardware devices have the same ID numbers, the access ID numbers may be generated by using additional, perhaps random, data as input to the secure hash function. The data storage device stores the access ID and associates it with selected device pools, such as memory elements. The memory elements may either be single elements such as a disk or portion of a disk, or a group of memory elements. Once the access is associated with particular device pools, the system administrator may assign or remove access levels. With the use in this exemplary embodiment of the secure hash program, the access ID numbers may not even be known by the host system, but are recreated from the hardware ID at the time of access, thus preventing any access from a location different from the authorized host system.

While the invention has been disclosed in connection with the preferred embodiments shown and described in detail, various modifications and improvements thereon will become readily apparent to those skilled in the art. Accordingly, the spirit and scope of the present invention is to be limited only by the following claims.

What is claimed is:

1. A method of controlling a data storage device, comprising:
   providing at least one requestor group that accesses the storage device;
   providing at least one pool of devices of the data storage device;
   providing a plurality of access types, wherein the access types include at least one of: control, configure, and track changes; and
   determining if a request by a requestor of the at least one requestor group is permitted for a device of the at least one pool of devices, wherein the device is an object of the request.

2. The method of claim 1, wherein the access types include at least one of mirroring, copying, back up, splitting, and tracking system calls.

3. The method of claim 1, wherein the access types further include reading data and writing data.

4. The method of claim 1, wherein the at least one group and the at least one pool includes at least one of logical units having unique ID numbers and physical units.

5. The method of claim 1, wherein the at least one pool includes at least one of: communication ports of the data storage device and portions of memory of the data storage device.

6. The method of claim 5, wherein the pool includes communication ports and the access rights indicate whether system calls are allowed on the communication ports.

7. The method of claim 5, wherein the pool includes portions of the memory and the access rights indicate at least one of read and write access to the sections.

8. A method of controlling access to a data storage device, comprising,
   providing a requestor identification number for each requestor having access to the data storage device, where the identification number uniquely identifies each requestor;
   partitioning memory of the data storage device into a plurality of memory segments, and defining an identification number for each of the segments;
   providing a plurality of request types including at least one of: read, write, mirroring, copying, back up, splitting, and tracking system calls; and
   allowing a requestor a selected type of request access to a selected one of the plurality of memory segments only if a database of requestor identification numbers indicates that the selected type of request to the selected memory segment is allowable according to the requestor identification number, wherein an override memory location stores one of a pass override condition, a reject override condition and no override condition.

9. The method of claim 8, further comprising:
   issuing an access request denied indication if the database indicates that the identification number is not allowed for the specified type of access to the specified memory segment.

10. The method of claim 8, wherein the override memory location is checked before examining the database, and, if a pass override condition is stored therein, the request is allowed.

11. The method of claim 10, wherein a value stored in the override memory location reverts to the no override condition after a specified time period.

12. The method of claim 8, wherein the override memory location is checked before examining the database, and, if a reject override condition is stored therein, the request is denied.

13. The method of claim 8, wherein the plurality of memory segments are grouped into pools of devices and wherein allowing a requestor a selected type of request access includes examining a particular one of the pools of devices corresponding to the selected memory segment.

14. The method of claim 11, wherein the specified time period is thirty minutes.

15. A method of controlling access to a data storage device, comprising:
   providing at least one group of requestor devices from a plurality of requestor devices that access the data storage device by issuing requests for at least one of: reading data in a specified portion of the data storage device, writing data into a specified portion of the data storage device, backing up data from a specified portion of the data storage device, mirroring data, copying data from a specified portion of the data storage device, splitting volumes of the data storage device, and tracking changes to volumes of the data storage device;
   providing a plurality of pools of memory resources from a plurality of individual addressable memory resources of the data storage device; and
   prior to accessing the memory, providing control logic for the data storage device to determine whether a request from one of the plurality of requestor devices for access to at least one of the plurality of pools of memory resources is permissible, wherein an override memory location stores one of a pass override condition, a reject override condition and no override condition.

16. The method of claim 15, wherein the override memory location is checked before examining the database, and, if a pass override condition is stored therein, the request is allowed.

17. The method of claim 15, wherein the override memory location is checked before examining the database, and, if a reject override condition is stored therein, the request is denied.

18. The method of claim 15, wherein an access level for a group corresponding to the requestor is set to provide a lower access level than an access level set for any member of the group of requestors.

19. The method of claim 15, wherein a pool of memory resources allows more access than an access level set for any member of the pool.

20. The method of claim 16, wherein a value stored in the override memory location reverts to the no override condition after a specified time period.

21. The method of claim 18, wherein the access level of the group is examined before the access level of the requestor and, if access for the group is allowed, no check is made on the access level of the requestor.

22. The method of claim 19, wherein the access level of the pool is examined before the access level of the memory segment, and if access for the pool is not allowed, no check is made on the access level of the memory segment.

23. The method of claim 20, wherein the specified time period is thirty minutes.

24. A method of controlling access to a data storage device, comprising:
associating an ID number that identifies at least one of: a requestor having access to the storage element and a group to which the requestor belongs; and
determining if the requestor is allowed a requested type of access operation to at least a portion of the data storage device in accordance with access information, where the access information includes one or more access operations associated with at least one of: the requestor ID number, an ID number of the group, a password associated with the requestor, and a password associated with the group, wherein the access operation includes at least one of: control, configure, and track changes.

25. The method of claim 24, wherein the access operation further includes at least one of: backup, mirror, copy, and split.

26. The method of claim 25, wherein the access operation further includes at least one of: read data and write data.

27. The method of claim 25, wherein the access information uses only one of: the requestor ID number, the ID number of the group, the password associated with the requestor, and the password associated with the group.

28. The method of claim 25, wherein the access information uses a combination of the requestor ID number and the ID number of the group.

29. The method of claim 25, wherein the access information uses a combination of the ID number of the group and the password associated with the group.

30. The method of claim 25, wherein the access information uses a combination of the ID number of the group and at least one of: the password associated with the requestor and the password associated with the group.

31. A method of controlling access to a data storage device, comprising:
associating a password that identifies at least one of: a requestor having access to the storage element and a group to which the requestor belongs; and
determining if the requestor is allowed a requested type of access operation to at least a portion of the data storage device in accordance with access information, where the access information includes one or more access operations associated with the password, wherein the access operation includes at least one of: control, configure, and track changes.

32. The method of claim 31, wherein the access operation further includes at least one of: backup, mirror, copy, and split.

33. The method of claim 31, wherein the access operation further includes at least one of: read data and write data.

34. The method of claim 31, wherein the password is associated with the requestor.

35. The method of claim 31, wherein the password is associated with the group.

36. A computer program product that controls a data storage device, comprising:
executable code that handles at least one requestor group that accesses the storage device;
executable code that handles at least one pool of devices of the data storage device;
executable code that handles a plurality of access types, wherein the access types are selected from the group consisting of: mirror, split, and track changes; and
executable code that determines if a request by a requestor of the at least one requestor group is permitted for a device of the at least one pool of devices, wherein the device is an object of the request.

37. A computer program product that controls access to a data storage device, comprising,
executable code that handles a requestor identification number for each requestor having access to the data storage device, where the identification number uniquely identifies each requestor;
executable code that partitions memory of the data storage device into a plurality of memory segments, and defines an identification number for each of the segments;
executable code that handles a plurality of request types including at least one of: read, write, mirroring, copying, back up, splitting, and tracking system calls; and
executable code that allows a requestor a selected type of request access to a selected one of the plurality of memory segments only if a database of requestor identification numbers indicates that the selected type of request to the selected memory segment is allowable according to the requestor identification number, wherein an override memory location stores one of a pass override condition, a reject override condition and no override condition.

38. The computer program product of claim 37, further comprising:
executable code that issues an access request denied indication if the database indicates that the identification number is not allowed for the specified type of access to the specified memory segment.

39. The computer program product of claim 37, further comprising:

executable code that checks the override memory location before examining the database, and, if a pass override condition is stored therein, the request is allowed.

40. The computer program product of claim 39, further comprising:
executable code that causes a value stored in the override memory location to revert to the no override condition after a specified time period.

41. The computer program product of claim 37, further comprising:
executable code that checks the override memory location before examining the database, and, if a reject override condition is stored therein, the request is denied.

42. A computer program product that controls access to a data storage device, comprising:
executable code that handles at least one group of requestor devices from a plurality of requestor devices that access the data storage device by issuing requests for at least one of: reading data in a specified portion of the data storage device, writing data into a specified portion of the data storage device, backing up data from a specified portion of the data storage device, mirroring data, copying data from a specified portion of the data storage device, splitting volumes of the data storage device, and tracking changes to volumes of the data storage device;
executable code that handles a plurality of pools of memory resources from a plurality of individual addressable memory resources of the data storage device; and
executable code that determines whether a request from one of the plurality of requestor devices for access to at least one of the plurality of pools of memory resources is permissible, wherein an override memory location stores one of a pass override condition, a reject override condition and no override condition.

43. The computer program product of claim 42, further comprising:
executable code that checks the override memory location before examining the database, and, if a pass override condition is stored therein, the request is allowed.

44. The computer program product of claim 43, further comprising:
executable code that causes a value stored in the override memory location to revert to the no override condition after a specified time period.

45. The computer program product of claim 42, further comprising:
executable code that checks the override memory location before examining the database, and, if a reject override condition is stored therein, the request is denied.

46. A computer program product that controls access to a data storage device, comprising:
executable code that handles an ID number that identifies at least one of: a requestor having access to the storage element associated with a group to which the requestor belongs; and
executable code that determines if the requestor is allowed a requested type of access operation to at least a portion of the data storage device in accordance with access information, where the access information includes one or more access operations associated with at least one of: the requestor ID number, an ID number of the group, a password associated with the requestor, and a password associated with the group, wherein the access operation includes at least one of: control, configure, and track changes.

47. The computer program product of claim 46, further comprising:
executable code that causes the access information to include a combination of the requestor ID number and the ID number of the group.

48. The computer program product of claim 46, further comprising:
executable code that causes the access information to use a combination of the ID number of the group and at least one of: the password associated with the requestor and the password associated with the group.

49. The computer program product of claim 46, further comprising:
executable code that causes the access information to use a combination of the ID number of the group and the password associated with the group.

50. A computer program product that controls access to a data storage device, comprising:
executable code that handles a password that identifies at least one of: a requestor having access to the storage element and a group to which the requestor belongs; and
executable code that determines if the requestor is allowed a requested type of access operation to at least a portion of the data storage device in accordance with access information, where the access information includes one or more access operations associated with the password, wherein the access operation includes at least one of: control, configure, and track changes.

* * * * *